United States Patent
Boutwell et al.

(10) Patent No.: US 7,429,424 B2
(45) Date of Patent: Sep. 30, 2008

(54) SINTERING RESISTANT, LOW CONDUCTIVITY, HIGH STABILITY THERMAL BARRIER COATING/ENVIRONMENTAL BARRIER COATING SYSTEM FOR A CERAMIC-MATRIX COMPOSITE (CMC) ARTICLE TO IMPROVE HIGH TEMPERATURE CAPABILITY

(75) Inventors: Brett Allen Rohrer Boutwell, Liberty Township, OH (US); Irene Spitsberg, Loveland, OH (US); Christine Govern, Cincinnati, OH (US); Bangalore A. Nagaraj, West Chester, OH (US); Brian Thomas Hazel, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/006,368

(22) Filed: Dec. 6, 2004

(65) Prior Publication Data

US 2006/0121295 A1    Jun. 8, 2006

(51) Int. Cl.
*B32B 15/04* (2006.01)
*B32B 18/00* (2006.01)

(52) U.S. Cl. .............. 428/450; 428/446; 428/469; 428/472; 428/701; 428/702; 416/241 B; 416/241 R

(58) Field of Classification Search ........... 416/241 B, 416/241 R; 428/446, 450, 469, 472, 701, 428/702
See application file for complete search history.

(56) References Cited

U.S. PATENT DOCUMENTS

| | | | |
|---|---|---|---|
| 3,935,159 A | 1/1976 | Demillecamps et al. | 524/431 |
| 4,535,033 A | 8/1985 | Stecura | 428/633 |
| 5,683,761 A | 11/1997 | Bruce et al. | 427/596 |
| 5,780,110 A | 7/1998 | Schaeffer et al. | 427/327 |
| 5,792,521 A | 8/1998 | Wortman | 427/567 |
| 5,871,820 A | 2/1999 | Hasz et al. | 427/419.2 |
| 5,914,189 A | 6/1999 | Hasz et al. | 428/335 |
| 5,985,470 A | 11/1999 | Spitsberg et al. | 428/689 |
| 6,025,078 A | 2/2000 | Rickerby et al. | 428/469 |
| 6,117,560 A | 9/2000 | Maloney | 428/472 |
| 6,177,200 B1 | 1/2001 | Maloney | 428/472 |
| 6,258,467 B1 | 7/2001 | Subramanian | 428/633 |

(Continued)

OTHER PUBLICATIONS

Bruce, Robert W., "Development of 1232° C (2250° F) Erosion and Impact Tests for Thermal Barrier Coatings©", 12 pgs., Tribology Transactions, vol. 41 (1998).

Wu, J. et al., "Low-Thermal-Conductivity Rare-Earth Zirconates for Potential Thermal-Barrier-Coating Applications", Dec. 2002, pp. 3031-3035, Journal of the American Ceramic Society, vol. 85, No. 12.

(Continued)

*Primary Examiner*—John J. Zimmerman
*Assistant Examiner*—Aaron Austin
(74) *Attorney, Agent, or Firm*—Harrington & Smith, PC

(57) ABSTRACT

In accordance with an embodiment of the invention, a thermal barrier coating (TBC) for inclusion in a thermal barrier coating/environmental barrier coating system (TBC/EBC system) for use on a silicon containing material substrate is provided. The TBC comprises a compound having a primary constituent portion and a stabilizer portion stabilizing said primary constituent. The primary constituent portion of the TBC comprises hafnia present in an amount of at least about 5 mol % of the primary constituent. The stabilizer portion of said thermal barrier coating comprises at least one metal oxide comprised of cations with a +2 or +3 valence present in the amount of about 10 to about 40 mol % of the thermal barrier coating.

46 Claims, 3 Drawing Sheets

U.S. PATENT DOCUMENTS

| | | | |
|---|---|---|---|
| 6,284,323 B1 | 9/2001 | Maloney | 427/419.2 |
| 6,319,614 B1 | 11/2001 | Beele | 428/469 |
| 6,410,148 B1 | 6/2002 | Eaton, Jr. et al. | 428/446 |
| 6,444,335 B1 | 9/2002 | Wang et al. | 428/701 |
| 6,620,465 B2 | 9/2003 | Rigney et al. | 427/567 |
| 6,620,525 B1 | 9/2003 | Rigney et al. | 428/633 |
| 6,730,422 B2 | 5/2004 | Litton et al. | 428/701 |
| 6,730,918 B2 | 5/2004 | Srivastava et al. | 250/458.1 |
| 6,733,908 B1 | 5/2004 | Lee et al. | 428/702 |
| 6,759,151 B1 | 7/2004 | Lee | 428/701 |
| 6,858,334 B1 | 2/2005 | Gorman et al. | 428/701 |
| 6,875,529 B1 | 4/2005 | Spitsberg et al. | 428/701 |
| 6,982,126 B2 | 1/2006 | Darolia et al. | 428/701 |
| 7,115,326 B2 | 10/2006 | Spitsberg et al. | 428/697 |
| 7,115,327 B2 | 10/2006 | Spitsberg et al. | 428/697 |
| 7,166,373 B2 | 1/2007 | Spitsberg et al. | 428/702 |
| 7,226,672 B2 | 6/2007 | Litton et al. | 428/701 |
| 2002/0028344 A1 | 3/2002 | Beele | 428/632 |
| 2002/0098391 A1 | 7/2002 | Tanaka et al. | 428/697 |
| 2002/0172837 A1 | 11/2002 | Allen et al. | |
| 2003/0108768 A1* | 6/2003 | Subramanian | 428/689 |
| 2004/0043244 A1* | 3/2004 | Bruce et al. | 428/632 |
| 2004/0175597 A1 | 9/2004 | Litton et al. | 428/702 |
| 2005/0142392 A1 | 6/2005 | Spitsberg et al. | 428/701 |
| 2005/0142394 A1 | 6/2005 | Spitsberg et al. | 428/701 |
| 2005/0142395 A1 | 6/2005 | Spitsberg et al. | 428/701 |
| 2005/0255648 A1* | 11/2005 | Bhatia et al. | 438/218 |
| 2006/0115659 A1 | 6/2006 | Hazel et al. | 428/450 |
| 2006/0121293 A1 | 6/2006 | Boutwell et al. | 428/469 |
| 2006/0166016 A1 | 7/2006 | Spitsberg et al. | |
| 2006/0166018 A1 | 7/2006 | Spitsberg et al. | 428/471 |

OTHER PUBLICATIONS

Hill, M.D. et al., "Creating an Effective Barrier", Internet Article Posted Sep. 4, 2003, pp. 1-5, http://www.ceramicindustry.com/CDA/ArticleInformation/coverstory/BNPCoverstoryIte . . . .

"Next Generation Thermal Barrier Coatings Using DVD", pp. 1-8, Internet Article http://www.ipm.virginia.edu/newresearch/tbc/home.php, Intelligent Processing of Materials LA, Research at IPM Laboratories.

Patent Abstracts of Japan, F. Takayuki, "Production of Multilayer Ceramic Material", vol. 2000, No. 12, Jan. 3, 2001, publication No. 2000 2647 46 A.

Yirong He et al., "Development of Refractory Silicate-YSZ Dual Layer TBCs", NASA/TM-1999-209079, Jul. 1999, XP002363430 retrieved from the Internet: URL:http://gltrs.grc.nasa.gov/reports/1999/TM-1999-209079.pdf, 19 pages.

Uneo Shunkichi et al: "Development of oxide-based EBC for silicon nitride", Int. J. Appl. Cerma. Technol. 2004, vol. 1, No. 4., Oct. 2004, pp. 362-373.

Stecura Stephan: "New ZrO2-YbO3 Plasma-Sprayed Coatings for Thermal Barrier Applications" Thin Solid Films Jun. 22, 1987, vol. 150, No. 1, pp. 15-40.

Zhu D et al: "Thermal conductivity and stability . . . " NASA/TM-2003-212544, Nov. 2003, pp. 1-10.

Levi Carlos, "Emerging Materials and Processes for Thermal Barrier Systems", pp. 1-34.

Vargas et al., "Alumina A12)3 (110): An ab-initio Examination of the Surface Electronic Structure".

Lopato et al., "Synthesis and Properties of M4Zr3O12 Compounds . . . ", Neorganicheskie Materialy, vol. 27, iss 8, pp. 1718-1722 as presented by "Inorganic Materials" vol. 27 iss 5, pp. 1445-1449, 1991 (translation).

U.S. Appl. No. 11/170,469, filed Jun. 28, 2005.

* cited by examiner

SINTERING RESISTANT, LOW CONDUCTIVITY, HIGH STABILITY THERMAL BARRIER COATING/ENVIRONMENTAL BARRIER COATING SYSTEM FOR A CERAMIC-MATRIX COMPOSITE (CMC) ARTICLE TO IMPROVE HIGH TEMPERATURE CAPABILITY

GOVERNMENT RIGHTS

The invention was made in part under contract number N00421-00-3-0536 awarded by the Government (Navy). Accordingly, the Government has certain rights in this invention.

CROSS-REFERENCE TO RELATED APPLICATION

The subject application shares certain attributes with U.S. Ser. No. 11/006,367, entitled, "Low Thermal Conductivity Thermal Barrier Coating System and Method Therefor" and with U.S. Ser. No. 11/006,292, entitled, "Thermal Barrier Coating/Environmental Barrier Coating System For A Ceramic-Matrix Composite (CMC) Article To Improve High Temperature Capability", each of which are filed concurrently herewith.

FIELD OF THE INVENTION

This invention relates to coating systems suitable for protecting components exposed to high-temperature environments, such as the hostile thermal environment of a gas turbine engine. More particularly, this invention is directed to a thermal/environmental barrier coating system for a substrate formed of a material containing silicon.

BACKGROUND OF THE INVENTION

Higher operating temperatures for gas turbine engines are continuously sought in order to increase their efficiency. However, as operating temperatures increase, the high temperature durability of the components of the engine must correspondingly increase. In this regard, materials containing silicon, particularly those with silicon carbide (SiC) as a matrix material or a reinforcing material, are currently being used for high temperature applications, such as for combustor and other hot section components of gas turbine engines, because of the excellent capacity of these silicon materials to operate at higher temperatures.

However, it has been found that silicon containing substrates can recede and lose mass as a result of a formation volatile Si species, particularly $Si(OH)_x$ and SiO when exposed to high temperature, aqueous environments. For example, silicon carbide when exposed to a lean fuel environment of approximately 1 ATM pressure of water vapor at 1200° C. will exhibit weight loss and recession at a rate of approximately 152.4 microns per 1000 hrs. It is believed that the process involves oxidation of the silicon carbide to form silica on the surface of the silicon carbide followed by reaction of the silica with steam to form volatile species of silicon such as $Si(OH)_x$.

Methods, such as described in U.S. Pat. No. 6,410,148, the disclosure of which is hereby incorporated by reference in its entirety, has dealt with the above problem concerning use of the silicon based substrates by providing a sufficient environmental barrier coating (EBC) for silicon containing substrates which inhibits the formation of volatile silicon species, $Si(OH)_x$ and SiO, thereby reduce recession and mass loss, and which provides thermal protection to and closely matches the thermal expansion of the silicon based substrate. U.S. Pat. No. 6,410,148 describes using an EBC comprising barium strontium aluminosilicate (BSAS) to protect the silicon based substrate. In further embodiments, an intermediate layer is described for providing adhesion between the substrate and/or to prevent reactions between the BSAS barrier layer and the substrate. Still further a bond layer between the immediate layer and the substrate may also be provided which includes silicon.

Although Barium-strontium-aluminosilicate (BSAS) coatings have been shown to provide excellent environmental protection and good thermal barrier protection to silicon based components exposed to temperatures of up to about 2500° F. (1371° C.), these systems may encounter problems when the EBC and the component are subjected to higher operating temperatures above 2500° F. In particular, for application temperatures approaching the melting temperature of BSAS (about 1700° C.), these BSAS protective coating may require a thermal-insulating top coat. U.S. Pat. No. 5,985,970 to Spitsberg et al., the disclosure of which is hereby incorporated by reference in its entirety, mentions the use of a top coat comprising 7% yttria stabilized zirconia (7% YSZ) as a top layer to a BSAS bond coat for solving this problem.

Further still, as application temperatures increase further beyond the thermal capability of a Si-containing material (limited by a melting temperature of about 2560° F. (about 1404° C.) for silicon), conventional TBC's mentioned above may not adequately protect the underlying component. Rather, under elevated temperatures approaching 3000° F. or greater, still thicker coatings capable of withstanding higher thermal gradients may be required. However, as coating thickness increases, strain energy due to the CTE mismatch between individual coating layers and the substrate increases as well, which can cause debonding and spallation of the coating system. In order to combat this problem, U.S. Pat. No. 6,444,335 to Wang, et al., the disclosure of which is hereby incorporated by reference in its entirety, describes adding a CTE transition layer between the EBC, e.g. BSAS and the TBC, YSZ for ensuring adherence of the TBC layer to the EBC.

While, the transition layer, EBC, TBC combination of the '335 patent was an improvement over prior methods for running components at higher operating temperatures between about 2500° F. (1371° C.) to 3000° F. (1649° C.), the TBC/EBC system of the '335 patent when subjected to higher operating temperatures may not provide optimum thermal and/or environmental protection to their underlying silicon based component.

After exposure to temperatures of about 3000° F. (1649° C.) and above, the electron beam physical vapor deposited (EP-PVD) columns of the TBC's (YSZ) of some of the prior systems may become subject to sintering, wherein a pulling in leaving large gaps between the columns results. When the above sintering occurs, the TBC layer may have limited protective capability and provide a direct route of attack to the EBC and/or underlayers of the TBC. For example, cracks may continue into the underlying EBC and sometimes through the BSAS layer when the TBC has been subject to sintering or spallation. Additionally, the thermal conductivity of the sintered top coat layer increases, undesirably changing the thermal insulating properties of the coating system.

Moreover, a reduction of the distinct EB-PVD (electron beam-physical vapor deposition) columnar structure due to sintering of adjacent columns is possible. This column sintering will reduce the strain tolerance of the structure and can result in increased interfacial strain and early spallation of the coating. Additionally at extended times at higher operating temperatures of about 3000° F. (1649° C.) and above, some prior TBC (YSZ) systems have a phase instability, which leads to degradation of the TBC coating and ultimately the TBC/EBC system.

Accordingly, there is a need in the art for an improved TBC for use in an TBC/EBC system which provides sufficient thermal and environmental protection to underlying silicon based substrate components operating at temperatures of about 3000° F. (1649° C.) or higher for short or extended periods of time. In particular, an improved TBC is needed which has improved resistance to sintering and improved phase stability for use with a sufficient EBC for coating a silicon containing material substrate.

BRIEF DESCRIPTION OF THE INVENTION

In accordance with an embodiment of the invention, a thermal barrier coating (TBC) for inclusion in a thermal barrier coating/environmental barrier coating system (TBC/EBC system) for use on a silicon containing material substrate is provided. The TBC comprises a compound having a primary constituent portion and a stabilizer portion stabilizing said primary constituent. The primary constituent portion of the TBC comprises hafnia present in an amount of at least about 5 mol % of the primary constituent. The stabilizer portion of said thermal barrier coating comprises at least one metal oxide comprised of cations with a +2 or +3 valence present in the amount of about 10 to about 40 mol % of the thermal barrier coating. Such preferred oxides which may be used to form the stabilizer portion of the TBC include $Y_2O_3$ (Yttria), $La_2O_3$ (Lanthanum Oxide), $Pr_2O_3$ (Praseodymium Oxide), $Nd_2O_3$ (Neodymium Oxide), $Sm_2O_3$ (Samarium Oxide), $Eu_2O_3$ (Europium Oxide), $Gd_2O_3$ (Gadolinium Oxide), $Tb_2O_3$ (Terbium Oxide), $Dy_2O_3$ (Dysprosium Oxide), $Ho_2O_3$ (Holmium Oxide), $Er_2O_3$ (Erbium Oxide), $Tm_2O_3$ (Thulium Oxide), $Yb_2O_3$ (Ytterbium Oxide), $Lu_2O_3$ (Lutetium Oxide), $Sc_2O_3$ (Scandium Oxide), MgO (Magnesium Oxide), CaO (Calcium Oxide), and mixtures thereof.

In accordance with another embodiment of the invention, an article is provided. The article comprises a substrate comprising silicon containing material, an environmental barrier coating (EBC) overlying the substrate, and a thermal barrier coating (TBC) on the environmental barrier coating. The TBC comprises a compound having a primary constituent portion and a stabilizer portion stabilizing the primary constituent. The primary constituent portion of the TBC comprises hafnia present in an amount of at least about 5 mol % of the primary constituent. The stabilizer portion of said thermal barrier coating comprises at least one metal oxide comprised of cations with a +2 or +3 valence present in the amount of about 10 to about 40 mol % of the thermal barrier coating.

In accordance with another embodiment of the invention, a gas turbine engine component formed of a silicon containing material and having a thermal/environmental barrier coating system on a surface thereof is provided. The thermal/environmental barrier coating system comprises an environmental barrier coating (EBC) comprising a bond layer, a first layer and a second layer. The bond layer is located on the surface between the first layer and the substrate and comprises at least one of silicon metal and silicon dioxide. Moreover, the first layer is located on the bond layer and comprises at least one of mullite, mullite-barium strontium aluminosilicate, mullite-yttrium silicate and mullite-calcium aluminosilicate in an amount of between about 40 to 80 wt. % mullite and between about 20 to 60 wt. % barium strontium aluminosilicate, ytrium silicate or calcium aluminosilicate. The second layer of the EBC is located on the first layer of the EBC and consists essentially of barium strontium aluminosilicate. The thermal/environmental barrier coating system further comprises a thermal barrier coating (TBC) on the EBC. The TBC comprises a compound having a primary constituent portion and a stabilizer portion stabilizing the primary constituent, with the primary constituent portion of the thermal barrier coating comprising hafnia in an amount of at least about 5 mol % of the primary constituent, and wherein the stabilizer portion of the thermal barrier coating comprises at least one metal oxide comprised of cations with a +2 or +3 valence present in the amount of about 10 to about 40 mol % of the thermal barrier coating. In addition, the thermal/environmental barrier coating system optionally comprises a coefficient of thermal expansion (CTE) transition layer between the TBC and the EBC, with the CTE transition layer having a CTE between that of the TBC and EBC. Further, the CTE transition layer comprises a TBC matching CTE portion and a EBC matching CTE portion, wherein the TBC matching portion comprising at least one of a metal oxide stabilized hafnia composition, a metal oxide stabilized zirconia composition, a metal oxide stabilized hafnia/zirconia composition and mixtures thereof, and wherein the EBC matching CTE portion comprising at least one of BSAS, mullite, alumina and any mixtures thereof.

In accordance with yet another embodiment of the present invention, a method for producing a thermal barrier coating/environmental barrier coating system on a silicon containing material substrate is provided. The method comprises applying an environmental barrier coating (EBC) over the silicon containing material substrate; and then applying a thermal barrier coating (TBC) over the EBC. The thermal barrier coating comprising a compound having a primary constituent portion and a stabilizer portion stabilizing the primary constituent. The primary constituent portion of said thermal barrier coating comprises hafnia present in an amount of at least about 5 mol % of the primary constituent. The stabilizer portion of said thermal barrier coating comprises at least one metal oxide comprised of cations with a +2 or +3 valence present in the amount of about 10 to about 40 mol % of the thermal barrier coating.

DETAILED DESCRIPTION OF THE INVENTION

Embodiments of the invention improve upon prior systems TBC/EBC systems used on substrates and/or components comprised of silicon containing materials for high temperature applications. It does so by providing a thermal barrier coating which exhibits better resistance to sintering, improved phase stability, lower thermal conductivity, thereby allowing the silicon material containing substrate to operate at higher temperatures and also for longer durations than some conventional TBC/EBC systems which utilize conventional thermal barrier coatings such as 7% YSZ. Some examples of TBC/EBC systems of embodiments of the present invention are discussed below.

Figure 1:
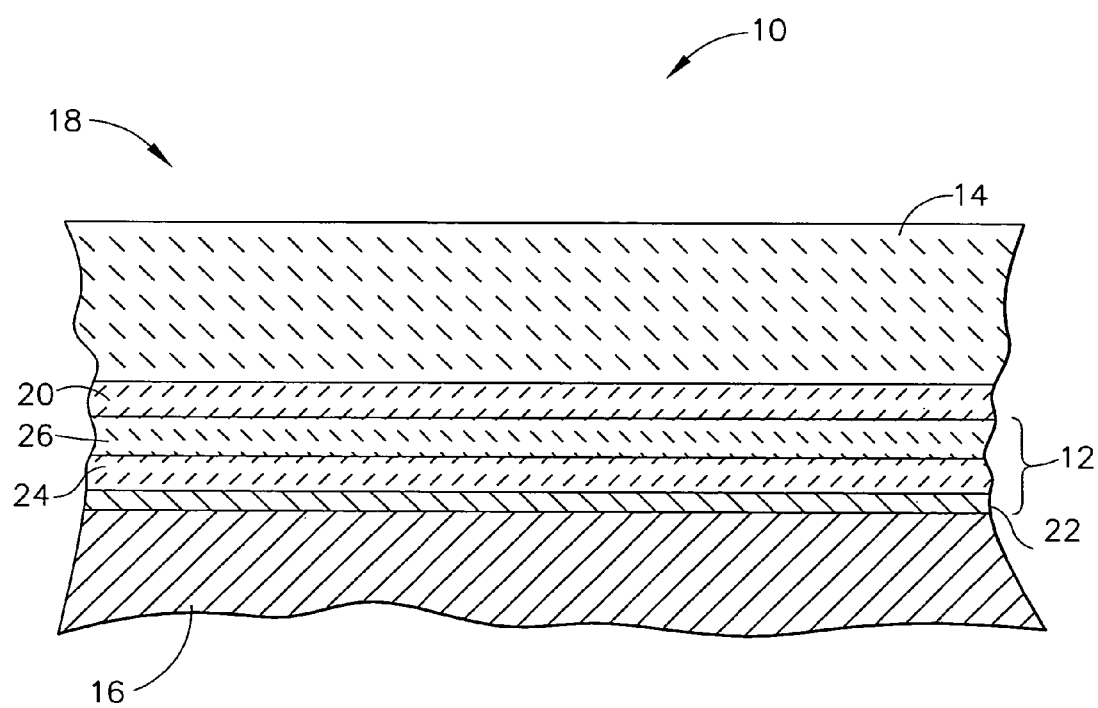
FIG. 1 is a cross-sectional view of a gas turbine engine component formed of a Si-containing material and having a thermal/environmental barrier coating system in accordance with an embodiment of the invention.

Referring to FIG. 1, a TBC/EBC system 10 of a first embodiment of the present invention is shown. The TBC/EBC system 10 includes an EBC 12, a TBC 14 or top coat and a surface region 16 or substrate of a hot section component 18. The TBC/EBC system of the first embodiment further optionally comprises a CTE transition layer 20 in between the TBC 14 and EBC 12. The component 18, or at least the surface region (substrate) 16 of the component 18, is formed of a silicon-containing material (particularly those for articles exposed to high temperatures), such as SiC/SiC ceramic matrix composites (CMC). However, the invention is generally applicable to other materials containing silicon in any form. For example, other silicon containing materials for use herein include, but are not limited to, those with a dispersion of silicon carbide, silicon carbide and/or silicon particles as a reinforcement material in a metallic or nonmetallic matrix, as well as those having a silicon carbide, silicon nitride and/or silicon-containing matrix, and particularly composite materials that employ silicon carbide, silicon nitride and/or silicon as both the reinforcement and matrix materials (e.g., SiC/SiC ceramic matrix composites (CMC)).

In addition, examples of components 18 which may be used herein include, but are not limited to, combustor components, blades, shrouds, flaps, seals, vanes, and other hot section components of gas turbine engines.

The surface region 16 of the component 18 is protected by the multilayer TBC/EBC system 10 that includes the EBC 12 for providing environmental protection to the component 10 and a top coat or TBC 14 provided on top of the EBC for providing thermal insulation to the underlying CTE transition layer 20, EBC layer(s) 12 and component 18. A suitable thickness range for the TBC 14 is about 12.5 to about 1250 microns (about 0.0005 to about 0.050 inch), with a preferred range of about 76.2 to about 254 microns (0.003 to about 0.010 inch, depending on the particular application.

The TBC 14 of the TBC/EBC system 10 comprises a primary constituent and a stabilizer combined together to form the TBC 14 material. The primary constituent of the TBC 14 may be comprised of either 100% hafnia ($HfO_2$) or a mixture of hafnia and zirconia (hafnia/zirconia mixture). In the hafnia/zirconia mixture, hafnia is present in an amount of about 5 to about 100 mol % of the primary constituent and zirconia is present in an amount of about 0 to about 95 mol % of the primary constituent. In certain embodiments, hafnia is present in an amount of from about 95 mol % to about 100% mol % of the primary constituent and zirconia is present in an amount of about 0 mol % to about 5 mol % of the primary constituent. Also in certain embodiments, the primary constituent is comprised of about 95 mol % to 100 mol % of hafnia and about 5 mol % to 0 mol % zirconia and the stabilizer portion is comprised of about 10 mol % to about 20 mol % yttria.

The stabilizer portion of the TBC 14 which stabilizes the primary constituent portion (100% hafnia or a mixture of hafnia and zirconia) of the TBC 14, preferably comprises at least one metal oxide comprised of cations with a +2 or +3 valence (MO or $M_2O_3$ oxides) and mixtures thereof. The stabilizers are present in the TBC 14 in an amount from about 10-40 mol % of the TBC 14. The preferred metal oxides (i.e. comprised of cations with a +2 or +3 valence) for use as stabilizers include $Y_2O_3$ (Yttria), $La_2O_3$ (Lanthanum Oxide), $Pr_2O_3$ (Praseodymium Oxide), $Nd_2O_3$ (Neodymium Oxide), $Sm_2O_3$ (Samarium Oxide), $Eu_2O_3$ (Europium Oxide), $Gd_2O_3$ (Gadolinium Oxide), $Tb_2O_3$ (Terbium Oxide), $Dy_2O_3$ (Dysprosium Oxide), $Ho_2O_3$ (Holmium Oxide), $Er_2O_3$ (Erbium Oxide), $Tm_2O_3$ (Thulium Oxide), $Yb_2O_3$ (Ytterbium Oxide), $Lu_2O_3$ (Lutetium Oxide), $Sc_2O_3$ (Scandium Oxide), MgO (Magnesium Oxide), CaO (Calcium Oxide), and mixtures thereof. Moreover, the compound $CeO_2$ (Cerium Oxide) may also be used as a possible stabilizer for the TBC 14.

It has been discovered that a thermal barrier coating which incorporates hafnia in amount of at least about 5 mol % and upwards is less prone to sintering than conventional TBC coatings of the prior art, e.g. YSZ top coats. This hafnia incorporation will reduce the degree of sintering present in the coating, better protecting the nature of the TBC layer. Additionally, hafnia relative to zirconia, serves to reduce the thermal conductivity of the TBC due to differences in specific heat and atomic mass which can increase phonon scattering. Moreover, the reduced sintering will prevent the conductivity from increasing by retaining the deposited porosity level of the TBC.

In addition, the stabilizers are mixed with hafnia (in the amounts described above) or with the hafnia/zirconia combination (in the amounts described above) in an amount of about 10-40 mol % primarily to achieve a pyrochlore crystal structure or a cubic crystal structure (e.g. fluorite) for the TBC 14 compound. The cubic or pychlore crystal structures are selected for the TBC 14 because either of these two structures will remain stable during repeated thermal cycling and extended hold times at temperatures greater than about 3000° F. (1649° C.). The compound of the TBC 14 will remain in either the cubic or pyrchlore phase throughout the operation of the component for which it is thermally insulating, even at operating temperatures as high as 3100° F. (1704° C.) and also for extended periods of time. In other words, the phase (cubic crystal structure or pyrochlore crystal structure) of the deposited TBC 14 is consistent throughout the operating process of the component, so as to provide a TBC 14 which in addition to being resistant to sintering, having a low thermal conductivity, also has the property of being phase stable under high operating temperatures.

The pyrochlore crystal structure and the cubic crystal structures of the TBC 14 referred to above are both known in the art and are defined in U.S. Pat. Nos. 6,284,323, 6,177,200 B1 and U.S. Pat. No. 6,117,560, the disclosures all of which are hereby incorporated by reference in their entirety.

It is noted herein that the above phase stability of the TBC 14 compound provides a great advantage over the conventional YSZ top coats which have a metastable tetragonal structure. Specifically, the tetragonal structure of some of the YSZ prior top coats is metastable and is known to undergo phase transformations when exposed to high operating temperatures for extended durations of time, such that the structure of the YSZ TBC splits into both a monoclinic and cubic phase. This phase transformation may cause a strain within the TBC itself. It can lead to cracking and spallation of the TBC, which eventually can lead to loss of the TBC layer entirely, ultimately possibly leading to a failure to maintain the component at its desired operating temperature. In contrast, the TBC 14 of the present invention remains phase stable and will not undergo these transformations.

As mentioned above, in forming the TBC/EBC system 10 of the present invention, the TBC 14 is applied on top of the EBC 12 for thermally insulating the underlying layer(s) of the EBC 12 and the component 18. Any EBC known in the art for use with silicon containing material substrates may be used in accordance with the TBC 14 of the present invention in forming the TBC/EBC system 10. Nevertheless, there are certain EBC's which are more advantageous for use with the TBC 14 of the present invention, depending upon the application for which the TBC/EBC is being used.

For example, the TBC/EBC system 10 of the first embodiment depicted FIG. 1, has a multilayered EBC 12 with the optional CTE transition layer 20 located between the TBC 14 layer and EBC 12. As discussed above, the TBC 14 includes a primary constituent and a stabilizer portion for stabilizing the primary constituent, wherein the primary constituent of the TBC 14 is preferably comprised either entirely of hafnia or comprised of a hafnia/zirconia mixture (i.e. hafnia present in an amount of from about 5 to 100 mol % of the primary constituent and zirconia is present in an amount of from about 0 to 95 mol % of the primary constituent) and wherein the stabilizer portion comprises a metal oxide comprised of cations with a +2 or +3 valence present in an amount of from about 10-40 mol % of the TBC 14. This TBC/EBC system 10 embodiment provides effective thermal and environmental protection to components having silicon based substrates over a wide range of operating temperatures, including but not limited to very high operating temperatures as high as about 3000° F. (1649° C.) or higher over numerous thermal cycles, as well as also providing effective thermal and environmental protection at significantly lower operating temperatures, if desired. In this embodiment, the CTE transition layer 20 preferably has a CTE between that of the TBC 14 and EBC 12, and also plays a helpful role in allowing the operation of the component 18 (e.g. gas turbine engine component) under high temperature conditions by providing a CTE transition between the TBC 14 and EBC layers 12 to prevent spallation and debonding of the TBC/EBC coating system 10 which may occur in prior coating systems under elevated temperatures due to CTE mismatch between the layers.

In particular, the mulit-layered EBC 12 of the TBC/EBC system 10 of the first embodiment, preferably has three layers, as shown in FIG. 1. These three layers of the EBC preferably include a bond layer 22, a first layer 24 and a second layer 26. The bond layer 22 overlays the silicon substrate 16 of the component 18 and preferably comprises silicon. The first layer 24 is located on the bond layer 22 and preferably comprises mullite-barium strontium aluminosilicate in an amount of between about 40 to 80 wt. % mullite and between about 20 to 60 wt. % BSAS. Further, the second layer 26 of the EBC 12 preferably consists essentially of BSAS. Moreover, the CTE transition layer 20 located in between the TBC 14 and EBC 12, comprises a TBC matching CTE portion together with an EBC matching CTE portion. The TBC matching CTE portion preferably comprises at least one of a metal oxide stabilized hafnia composition, a metal oxide stabilized zirconia composition, a metal oxide stabilized hafnia/zirconia mixture composition and mixtures thereof. The EBC matching CTE portion preferably comprises at least one of BSAS, mullite, alumina and any mixtures thereof. Different embodiments for the CTE transition layer are described in U.S. Pat. No. 6,444,334, and may all be used in accordance with the present invention. It is noted that the TBC/EBC system embodiments of U.S. Pat. No. 6,444,334 may be used in accordance with the present invention, simply by substituting the TBC, i.e. YSZ of the '334 patent with the TBC 14 of the present invention and also if desired by optionally modifying the CTE transition layer of the '334 patent with the TBC materials of the present invention in a manner which would be apparent to one skilled in the art based upon the teaches of the present invention and the '334 patent.

Alternatively, if lower operating temperatures are desired instead for operating the component, such as temperatures below 3000° F. (1371° C.), some notably preferred EBC's may be used in accordance with the TBC of the present invention, for these applications, as well. For instance, in another embodiment, a single layer EBC, comprised preferably of BSAS, as described in U.S. Pat. No. 5,985,470 could be used with the TBC 14 of the present invention to form a TBC/EBC system which provides effective thermal and environmental protection to the underlying silicon containing material. Further, in yet another embodiment of the present invention, one could also use a multi (e.g. two or three layered) EBC, as described in U.S. Pat. No. 6,410,148, wherein for example the EBC comprises a barrier layer comprising preferably BSAS and an intermediate layer, between the barrier layer and the substrate, preferably comprising mullite (40 to 80 wt %) with BSAS (20 to 60 wt. %) and optionally further comprising a bond coat layer comprising silicon in between the substrate and the intermediate layer.

Other notable embodiments for the EBC 12 which may be used in conjunction with TBC 14 on a substrate containing silicon material include an EBC which is comprised of at least one of mullite, BSAS, rare earth aluminates, rare earth silicates, alkaline earth aluminates, alkaline earth silicates and mixtures thereof. In other embodiments, the EBC 12 is a single layer overlying the silicon containing material substrate and comprises at least one of mullite, BSAS, rare earth aluminates, rare earth silicates, alkaline earth aluminates, alkaline earth silicates and mixtures thereof. In yet further embodiments, the EBC 12 is a multiple layer EBC, wherein each layer of the multiple layer EBC is comprised of at least one of mullite, BSAS, rare earth aluminates, rare earth silicates, alkaline earth aluminates, alkaline earth silicates and mixtures thereof.

As mentioned above, any EBC known in the art for use with silicon containing material substrates may be used in accordance with the TBC 14 in forming the TBC/EBC system 10. Regardless of which EBC is used, the TBC 14 of the present invention, can provide improved resistance to sintering, improved phase stability and lower thermal conductivity compared to some conventional YSZ TBC's used to coat substrates comprised of silicon containing material.

For example, FIGS. 2a-3b, depict a thermal gradient performed for the purpose of comparing the performance of a TBC/EBC system of the prior art to the performance of the TBC/EBC 10 of the present invention at high operating temperatures of about 3100° F. (1704° C.) for about 50 hours (600 cycles). The results of this test indicated that the TBC/EBC system 10 (FIGS. 2b and 3b) of an embodiment of the present invention on a silicon containing material substrate, i.e. (SiC/Si/C)(CMC) provided a significantly greater degree of resistance to sintering than did the TBC/EBC system of the prior art (FIGS. 2a and 3a) on the same substrate and under the same high temperature operating conditions. A more detailed discussion of this test and the results is set forth below.

In the above test, the prior art TBC/EBC system sample comprised a EP-PVD deposited yttria-stabilized zirconia thermal barrier coating ($ZrO_2$-7 wt % $Y_2O_3$), air plasma sprayed (APS) CTE transition layer (50 wt. % YSZ+50 wt. % mullite) on a SiC/SiC ceramic matrix composite, and APS sprayed environmental barrier coating (100 wt % BSAS/20 wt % BSAS+80 wt % mullite/100 wt. % Si) on a SiC/SiC ceramic matrix composite. The TBC/EBC system sample of an embodiment of the present invention comprised a EP-PVD deposited yttria-stabilized hafnia thermal barrier coating (80 mol % $HfO_2$-20 mol % $Y_2O_3$ stabilizer), APS sprayed CTE transition layer (50 wt. % YSZ+50 wt. % mullite), APS sprayed environmental barrier coating (100 wt. % BSAS/20 wt. % BSAS+80 wt. % mullite/100 wt. % Si) on a SiC/SiC ceramic matrix composite. As can be seen from the above, both the prior art sample and the present invention sample utilized in the thermal gradient test are each 5 layered TBC/EBC systems (i.e. TBC, 3 EBC layers and CTE transition layer), identical to one another except for their respective TBC top coats.

The above samples were compared to one another by performing thermal gradient tests on each sample, wherein each sample was first cycled into an oxygen/propane gas mixture flame and heated at the front of each coated sample for approximately 5 minutes at a temperature of approximately 3100° F. (1704° C.) surface temperature while the backside of the substrate of each sample was being cooled at a backside temperature of approximately 2000° F. (1093° C.), thereby creating an 1100° F. (593° C.) temperature gradient to simulate the working conditions of a turbine engine. A pyrometer was used in this test for temperature measurements.

Subsequently, after 5 minutes of heating, each sample was removed from the flame and cooled by room temperature air for approximately another 5 minutes, thereby completing one full cycle of the thermal gradient test for each sample. A cycle for each sample is defined herein for the purposes of the above test as heating the coated sample in the flame at about 3100° F. (1704° C.) for 5 minutes while the substrate of the sample is simultaneously being back cooled at a temperature of 2000° F. (1093° C.), then removing the sample from the flame and then cooling the entire sample at room temperature. The above steps were repeated for each sample until 600 cycles (50 hot hours) were reached.

Figure 2A:
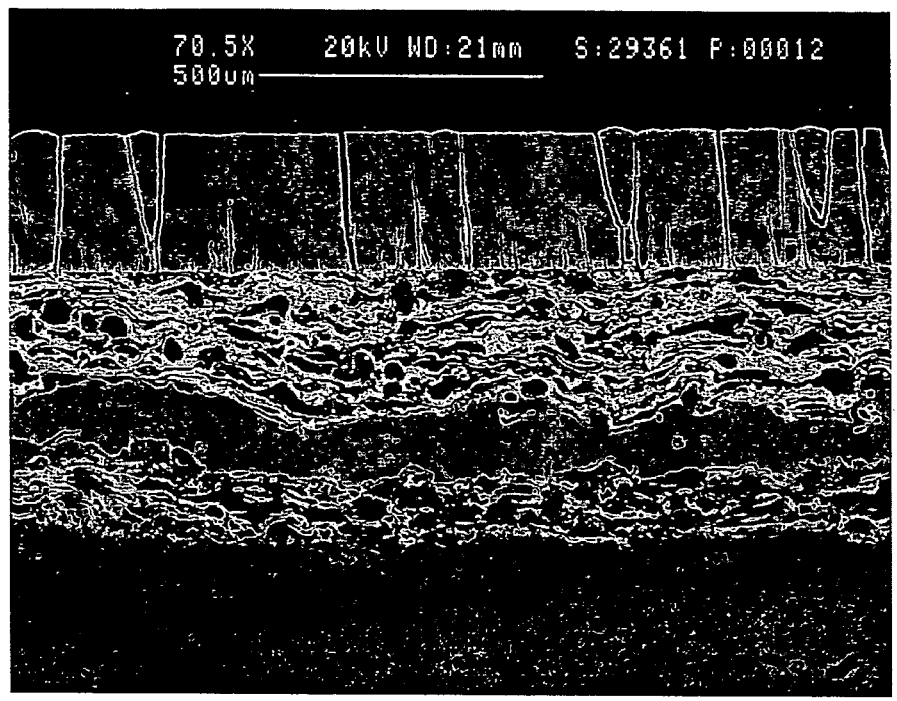
FIG. 2a is a photomicrograph of cross-section of a 5 layer TBC/EBC system sample of the prior art as deposited on a silicon containing material substrate, prior to performance of a thermal gradient test.
Figure 2B:
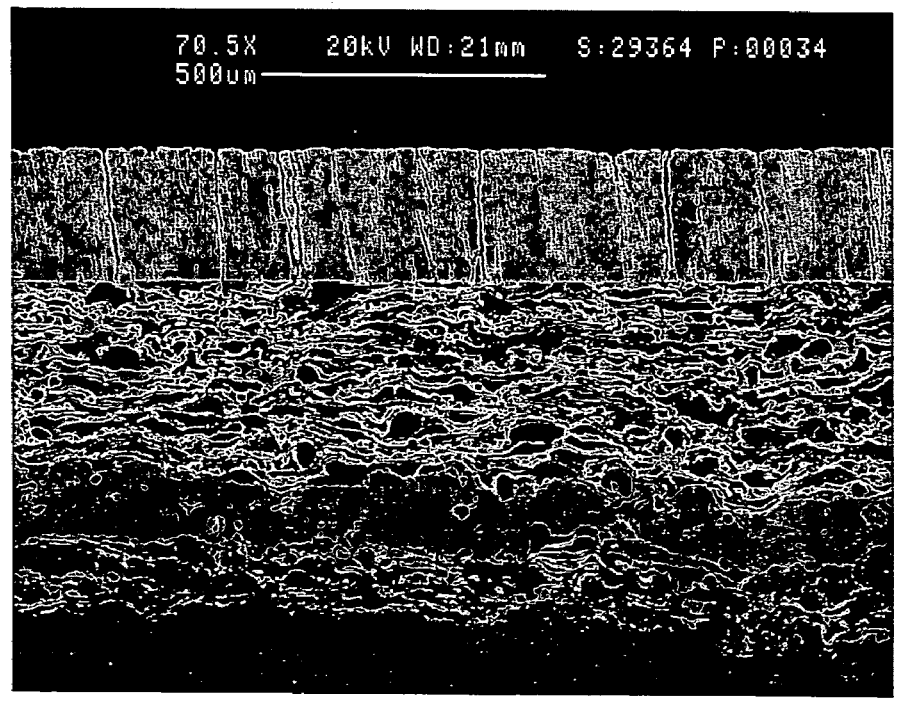
FIG. 2b is a photomicrograph of a cross-section of a 5 layer TBC/EBC system sample of an embodiment of the present invention as deposited on a silicon containing material substrate, prior to performance of a thermal gradient test.
Figure 3A:
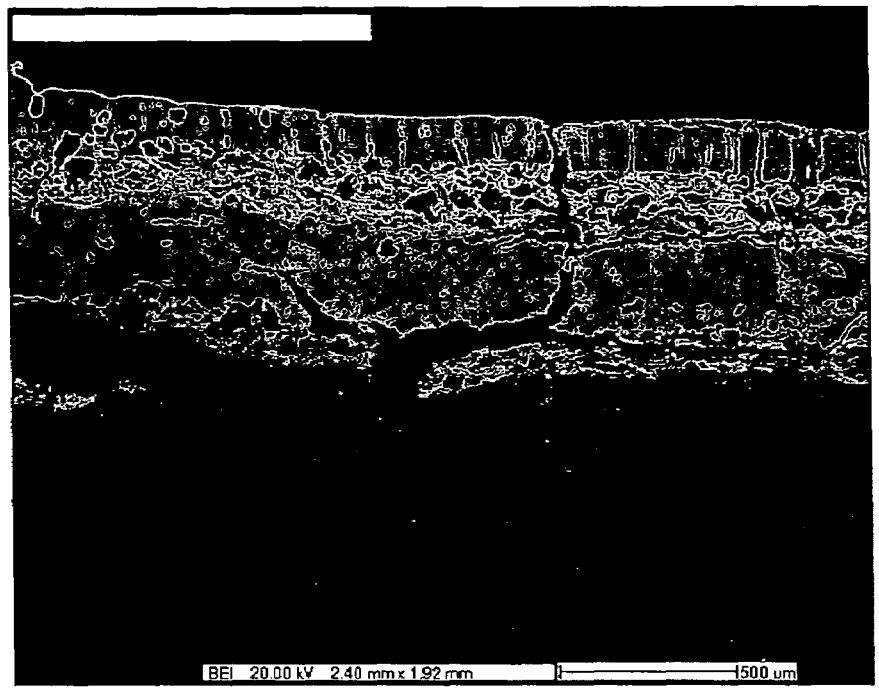
FIG. 3a is a photomicrograph of a cross-section of the 5 layer TBC/EBC system sample of the prior art of FIG. 2a after the performance of the thermal gradient test.
Figure 3B:
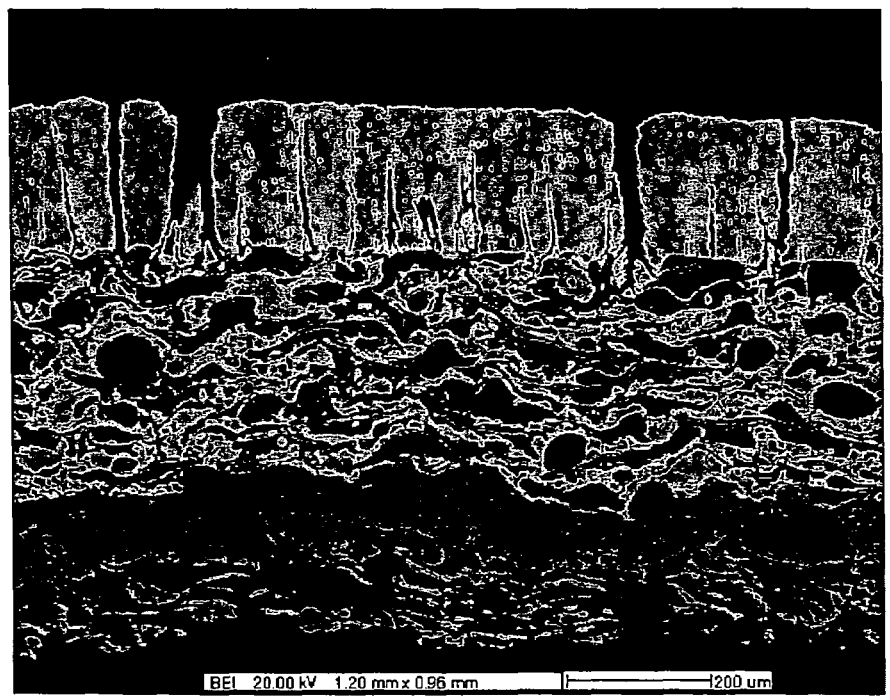
FIG. 3b is a photomicrograph of a cross-section of the 5 layer TBC/EBC system sample of the embodiment of the present invention of FIG. 2b after the performance of the thermal gradient test.

Once the 600 cycles of the thermal gradient test were reached for each sample, as can be readily seen from the photomicrographs of FIGS. 3a and 3b, the TBC/EBC system 10 sample of one embodiment of the present invention (FIGS. 2b and 3b) provided significantly greater resistance to sintering than the prior art TBC/EBC system sample (FIGS. 2a and 3a) when exposed to high temperatures of about 3100° F. (1704° C.). Specifically, one viewing FIG. 2a representing the TBC/EBC system as deposited, prior to the thermal cycling test in comparison to FIG. 3a, representing this same prior art TBC/EBC sample taken after the thermal gradient test was performed can readily see the extent of the heavy sintering and extensive damage caused to the TBC and underlying EBC of the prior art TBC/EBC system due to this high temperature test. In contrast, one viewing FIG. 2b representing the TBC/EBC system of one embodiment of the present invention as deposited, prior to the thermal cycling test in comparison to FIG. 3b, representing this same present invention embodiment TBC/EBC sample taken after the thermal gradient test was performed can readily ascertain that only very minor sintering had occurred in this TBC/EBC system and that the TBC/EBC system was intact and fully functional.

It is noted that the EBC's, CTE transition layer's and silicon containing material substrate's used for the prior art TBC/EBC system sample and the embodiment of the present invention TBC/EBC system sample were identical, the only differences between the samples were their respective TBC's. Namely, the prior art system sample had the conventional 7% YSZ top coat, whereas the present invention embodiment sample utilized a TBC comprising 80 mol % hafnia with a 20 mol % yttria stabilizer. The above test results provide further support for the fact that a TBC comprising hafnia stabilized as described herein provides much greater resistance to sintering for its TBC/EBC system and underlying silicon containing material component under very high operating temperatures than conventional TBCs, such as 7% YSZ.

In preparing the TBC/EBC system 10, the TBC 14 of the present invention can be deposited on the EBC 12 by any techniques known in the art, including plasma spraying and PVD techniques. Further, the EBC 12 of this invention can be deposited by air and vacuum plasma spraying (APS and VPS, respectively), though it is foreseeable that deposition could be performed by other known techniques, such as physical vapor deposition (PVD), EB-PVD and high velocity oxy-fuel (HVOF).

While our invention has been described in terms of a preferred embodiment, it is apparent that other forms could be adopted by one skilled in the art. Accordingly, the scope of our invention is to be limited only by the following claims.

What is claimed is:

1. A thermal barrier coating in a thermal barrier coating/environmental barrier coating system (TBC/EBC system) located on a silicon containing material substrate, comprising a compound having a primary constituent portion and a stabilizer portion stabilizing said primary constituent, said primary constituent portion of said thermal barrier coating (TBC) consisting of a mixture of hafnia present in an amount of at least about 5 mol % of the primary constituent and zirconia, and said stabilizer portion of said thermal barrier coating comprises at least one metal oxide comprised of cations with a +2 or +3 valence present in the amount of about 10 to about 40 mol % of the thermal barrier coating, wherein the TBC compound has a cubic or a pycholore crystal structure.

2. The thermal barrier coating of claim 1, wherein zirconia is present up to about 95 mol % of the primary constituent, and wherein said hafnia is present in an amount from about 5 to about 100 mol % of the primary constituent.

3. The thermal barrier coating of claim 2, wherein said primary constituent comprises hafnia present in an amount of from about 95 mol % to about 100% mol % of the primary constituent and wherein zirconia is present in an amount up to about 5 mol % of the primary constituent.

4. The thermal barrier coating of claim 1, wherein said primary constituent comprises hafnia present in an amount of from about 95 mol % to about 100% mol % of the primary constituent.

5. The thermal barrier coating of claim 1, wherein hafnia comprises about 100 mol % of the primary constituent.

6. The thermal barrier coating of claim 1, wherein said stabilizer portion comprises at least one of $Y_2O_3$ (Yttria), $La_2O_3$ (Lanthanum Oxide), $Pr_2O_3$ (Praseodymium Oxide), $Nd_2O_3$ (Neodymium Oxide), $Sm_2O_3$ (Samarium Oxide), $Eu_2O_3$ (Europium Oxide), $Gd_2O_3$ (Gadolinium Oxide), $Tb_2O_3$ (Terbium Oxide), $Dy_2O_3$ (Dysprosium Oxide), $Ho_2O_3$ (Holmium Oxide), $Er_2O_3$ (Erbium Oxide), $Tm_2O_3$ (Thulium Oxide), $Yb_2O_3$ (Ytterbium Oxide), $Lu_2O_3$ (Lutetium Oxide), $Sc_2O_3$ (Scandium Oxide), MgO (Magnesium Oxide), CaO (Calcium Oxide), and mixtures thereof.

7. The thermal barrier coating of claim 6, wherein said stabilizer portion is comprised of yttria.

8. The thermal barrier coating of claim 1, wherein said primary constituent consists of about 95 mol % to 100 mol % hafnia and about 5 mol % zirconia and the stabilizer portion is comprised of about 10 mol % to about 20 mol % yttria.

9. The thermal barrier coating of claim 1, wherein said TBC compound has a cubic crystal structure.

10. The thermal barrier coating of claim 1, wherein said TBC compound has a pycholore crystal structure.

11. The thermal barrier coating of claim 1, further comprising an environmental barrier coating between said substrate and said thermal barrier coating.

12. A thermal barrier coating in a thermal barrier coating/environmental barrier coating system (TBC/EBC system) located on a silicon containing material substrate comprising a compound having a primary constituent portion and a stabilizer portion stabilizing said primary constituent, said primary constituent portion of said thermal barrier coating (TBC) consisting of a mixture of hafnia present in an amount of at least about 5 mol % of the primary constituent and zirconia, and said stabilizer portion of said thermal barrier coating comprises $CeO_2$ present in the amount of about 10 to about 40 mol % of the thermal barrier coating, wherein the TBC compound has a cubic or a pycholore crystal structure.

13. An article comprising:
a substrate comprised of silicon containing material;
an environmental barrier coating (EBC) overlying the substrate;
a thermal barrier coating (TBC) on the environmental barrier coating, said thermal barrier coating comprising a compound having a primary constituent portion and a stabilizer portion stabilizing said primary constituent,
said primary constituent portion of said thermal barrier coating consisting of a mixture of hafnia present in an amount of at least about 5 mol % of the primary constituent and zirconia, and
said stabilizer portion of said thermal barrier coating comprises at least one metal oxide comprised of cations with a +2 or +3 valence present in the amount of about 10 to about 40 mol % of the thermal barrier coating, wherein the TBC compound has a cubic or a pycholore crystal structure.

14. The article as recited in claim 13, wherein said environmental barrier coating consists essentially of barium strontium aluminosilicate.

15. The article as recited in claim 13, wherein said environmental barrier coating consists of barium strontium aluminosilicate.

16. The article as recited in claim 13, wherein said environmental barrier coating is comprised of at least one of mullite, BSAS, rare earth aluminates, rare earth silicates, alkaline earth silicates and mixtures thereof.

17. The article as recited in claim 13, wherein said environmental barrier coating is a multiple layer EBC, wherein each layer of the multiple layer EBC is comprised of at least one of mullite, BSAS, rare earth aluminates, rare earth silicates, alkaline earth aluminates, alkaline earth silicates and mixtures thereof.

18. The article as recited in claim 13, further comprising a coefficient of thermal expansion (CTE) transition layer between said TBC and environmental barrier coating, said CTE transition layer having a CTE between that of the TBC and EBC.

19. The article as recited in claim 18, wherein said CTE transition layer comprises a TBC matching CTE and an EBC matching CTE portion,
said TBC matching CTE portion comprising at least one of a metal oxide stabilized hafnia composition, a metal oxide stabilized zirconia composition, a metal oxide stabilized hafnia/zirconia composition and mixtures thereof, and said EBC matching CTE portion comprising at least one of BSAS, mullite, alumina and any mixtures thereof.

20. The article as recited in claim 13, wherein said environmental barrier coating is a multi-layer coating comprising a first layer on the substrate and a second layer overlying the first layer,
said first layer comprises at least one of $SiO_2$, mullite, mullite barium strontium aluminosilicate, mullite-yttrium silicate, mullite calcium aluminosilicate, silicon metal and mixtures thereof, and
said second layer comprises barium strontium aluminosilicate.

21. The article as recited in claim 20, wherein said first layer of said EBC consists essentially of mullite-barium strontium aluminosilicate in an amount of between about 40 to 80 wt. % mullite and between about 20 to 60 wt. % barium strontium aluminosilicate.

22. The article as recited in claim 20, wherein said environmental barrier coating further comprises a bond layer between said substrate and said first layer of the environmental barrier coating, said bond layer comprises at least one of silicon metal and silicon dioxide.

23. The article as recited in claim 19, wherein said CTE transition layer is a substantially homogeneous mixture of the TBC matching CTE portion and the EBC matching CTE portion, with the TBC matching CTE portion constituting up to 90 weight percent of the CTE transition layer.

24. The article as recited in claim 18, wherein said CTE transition layer is comprised of a first and a second sublayer,
said first sublayer contacts the EBC and said first sublayer comprises at least one of a metal oxide stabilized hafnia composition, a metal oxide stabilized zirconia composition, a metal oxide stabilized hafnia/zirconia composition and mixtures thereof,
said second sublayer of the CTE transition layer is located on the first sublayer, said second sublayer comprises at least one of BSAS, mullite, alumina and any mixtures thereof.

25. The article as recited in claim 19, wherein said CTE transition layer has a continuously changing composition, wherein said CTE transition layer has a decreasing concentration of the EBC matching CTE portion and an increasing concentration of said TBC matching CTE portion in a direction away from the EBC.

26. The article as recited in claim 13, wherein the silicon containing material of said substrate is selected from the group consisting of metal matrix composites reinforced with at least one of silicon carbide, silicon nitride and silicon, composites having a matrix of at least one of silicon carbide, silicon nitride and silicon, composites with at least one of a silicon carbide, silicon nitride, silicon matrix reinforced with at least one of silicon carbide, silicon nitride and silicon, with at least one of silicon carbide and silicon nitride, monolithic ceramics with at least one of niobium silicide and molybdenum silicide and other silicon based metallics.

27. The article as recited in claim 13, wherein the article is a component of a gas turbine engine.

28. The article as recited in claim 13, wherein zirconia is present in an amount up to about 95% mol % of the primary constituent, and wherein said hafnia is present in an amount from about 5 to about 100 mol % of the primary constituent.

29. The article as recited in claim 28, wherein said primary constituent comprises hafnia present in an amount of from about 95 mol % to about 100% mol % of the primary constituent and wherein zirconia is present in an amount of about 5% mol % of the primary constituent.

30. The article as recited in claim 13, wherein said primary constituent comprises hafnia present in an amount of from about 95 mol % to about 100% mol % of the primary constituent.

31. The article as recited in claim 13, wherein hafnia comprises about 100 mol % of the primary constituent.

32. The article as recited in claim 13, wherein said stabilizer comprises at least one of $Y_2O_3$ (Yttria), $La_2O_3$ (Lanthanum Oxide), $Pr_2O_3$ (Praseodymium Oxide), $Nd_2O_3$ (Neodymium Oxide), $Sm_2O_3$ (Samarium Oxide), $Eu_2O_3$ (Europium Oxide), $Gd_2O_3$ (Gadolinium Oxide), $Tb_2O_3$ (Terbium Oxide), $Dy_2O_3$ (Dysprosium Oxide), $Ho_2O_3$ (Holmium Oxide), $Er_2O_3$ (Erbium Oxide), $Tm_2O_3$ (Thulium Oxide), $Yb_2O_3$ (Ytterbium Oxide), $Lu_2O_3$ (Lutetium Oxide), $Sc_2O_3$ (Scandium Oxide), MgO (Magnesium Oxide), CaO (Calcium Oxide), and mixtures thereof.

33. The article as recited in claim 32, wherein said stabilizer is comprised of yttria.

34. The article as recited in claim 13, wherein said primary constituent consists of about 95 mol % to 100 mol % hafnia and about 5 mol % zirconia and the stabilizer portion is comprised of about 10 mol % to about 20 mol % yttria.

35. The article as recited in claim 13, wherein said TBC compound has a cubic crystal structure.

36. The article as recited in claim 13, wherein said TBC compound has a pycholore crystal structure.

37. A gas turbine engine component formed of a silicon containing material and having a thermal/environmental barrier coating system on a surface thereof, the thermal/environmental barrier coating system comprising:
an environmental barrier coating (EBC) comprising a bond layer,
a first layer and
a second layer;
said bond layer is located on the surface between the first layer and the substrate and comprises at least one of silicon metal and silicon dioxide,
said first layer is located on said bond layer and comprises at least one of mullite-barium strontium aluminosilicate, mullite-yttrium silicate and mullite-calcium aluminosilicate in an amount of between about 40 to 80 wt. % mullite and between about 20 to 60 wt. % barium strontium aluminosilicate, yttrium silicate or calcium aluminosilicate, said second layer of said EBC is located on said first layer of said EBC, and
said second layer consists essentially of barium strontium aluminosilicate;
a thermal barrier coating (TBC) on the EBC, said TBC comprising a compound having a primary constituent portion and a stabilizer portion stabilizing said primary constituent,
said primary constituent portion of said thermal barrier coating consisting of a mixture of hafnia present in an amount of at least about 5 mol % of the primary constituent and zirconia,
said stabilizer portion of said thermal barrier coating comprises at least one metal oxide comprised of cations with a +2 or +3 valence present in the amount of about 10 to about 40 mol % of the thermal barrier coating, wherein said TBC compound has a cubic or a pychloric crystal structure; and
a coefficient of thermal expansion (CTE) transition layer between said TBC and said EBC, said CTE transition layer having a CTE between that of the TBC and EBC, said CTE transition layer comprises a TBC matching CTE portion and a EBC matching CTE portion, said TBC matching portion comprising at least one of a metal oxide stabilized hafnia composition, a metal oxide stabilized zirconia composition, a metal oxide stabilized hafnia/zirconia composition and mixtures thereof, said EBC matching CTE portion comprising at least one of BSAS, mullite, alumina and any mixtures thereof.

38. The gas turbine engine component as recited in claim 37, wherein zirconia is present up to about 95% of the primary constituent, and wherein said hafnia is present in an amount from about 5 to about 100 mol % of the primary constituent.

39. The gas turbine engine component as recited in claim 38, wherein said primary constituent comprises hafnia present in an amount of from about 95 mol % to about 100% mol % of the primary constituent and wherein zirconia is present in an amount of about 5% mol % of the primary constituent.

40. The gas turbine engine component as recited in claim 37, wherein said primary constituent comprises hafnia present in an amount of from about 95 mol % to about 100% mol % of the primary constituent.

41. The gas turbine engine component as recited in claim 37, wherein hafnia comprises about 100 mol % of the primary constituent.

42. The gas turbine engine component as recited in claim 37, wherein said stabilizer is comprises at least one of $Y_2O_3$ (Yttria), $La_2O_3$ (Lanthanum Oxide), $Pr_2O_3$ (Praseodymium Oxide), $Nd_2O_3$ (Neodymium Oxide), $Sm_2O_3$ (Samarium Oxide), $Eu_2O_3$ (Europium Oxide), $Gd_2O_3$ (Gadolinium Oxide), $Tb_2O_3$ (Terbium Oxide), $Dy_2O_3$ (Dysprosium Oxide), $Ho_2O_3$ (Holmium Oxide), $Er_2O_3$ (Erbium Oxide), $Tm_2O_3$ (Thulium Oxide), $Yb_2O_3$ (Ytterbium Oxide), $Lu_2O_3$ (Lutetium Oxide), $Sc_2O_3$ (Scandium Oxide), MgO (Magnesium Oxide), CaO (Calcium Oxide), and mixtures thereof.

43. The gas turbine component as recited in claim 35, wherein said primary constituent consists of a mixture of about 95 mol % to 100 mol % hafnia and about 5 mol % to zirconia and the stabilizer portion is comprised of about 10 mol % to about 20 mol % yttria.

44. A thermal barrier coating in a thermal barrier coating/environmental barrier coating system (TBC/EBC system) located on a silicon containing material substrate comprising a compound having a primary constituent portion and a stabilizer portion stabilizing said primary constituent,
said primary constituent portion of said thermal barrier coating (TBC) consisting of a mixture of hafnia present in an amount of at least about 5 mol % of the primary constituent and zirconia, and
said stabilizer portion of said thermal barrier coating comprises at least one metal oxide comprised of cations with a +2 or +3 valence, wherein the metal oxide is present in about 20 mol % of the thermal barrier coating, wherein the TBC compound has a cubic or a pycholore crystal structure.

45. The coating of claim 44, wherein hafnia is present in an amount of about 80 mol % of the thermal barrier coating.

46. A thermal barrier coating in a thermal barrier coating/environmental barrier coating system (TBC/EBC system) located on a silicon containing material substrate, comprising a compound having a primary constituent portion and a stabilizer portion stabilizing said primary constituent,
said stabilizer portion of said thermal barrier coating comprises at least one metal oxide comprised of cations with a +2 or +3 valence present in the amount of about 40 mol % of the thermal barrier coating, wherein said primary constituent consists of a mixture of about 95 mol % to 100 mol % hafnia and zirconia, and the TBC compound has a cubic or a pycholore crystal structure.

* * * * *